the product was impure and gave on paper a fluo-

United States Patent Office 2,715,629
Patented Aug. 16, 1955

2,715,629

SULFONIC ACID DERIVATIVES OF 2-(4'-DIALKYL-AMINOPHENYL)-BENZOTHIAZOLE

Frithjof Zwilgmeyer, Edgewood Hills, Del., assignor to E. I. du Pont de Nemours and Company, Wilmington, Del., a corporation of Delaware No Drawing. Application July 16, 1952, Serial No. 299,260

4 Claims. (Cl. 260—304)

This invention relates to new organic compounds useful as fluorescence agents. More particularly, this invention deals with the monosulfonic acids and water-soluble sulfonates of 2-(4'-dialkylamino-phenyl)-benzothiazole.

It is an object of this invention to prepare novel fluorescence agents, useful for the whitening of paper and having outstanding strength and solubility properties in addition to the desirable fluorescent hue. Additional objects and achievements of this invention will appear as the description proceeds.

The commercial whitening agents now used on paper belong to the diaminostilbenedisulfonic acid class. Their performance is generally satisfactory except for high cost, relatively insufficient tinctorial strength, which is in a sense another statement of high cost because it necessitates the use of larger quantities of fluorescent per unit weight of paper material, and poor solubility in water. Economical practice requires that a paper whitening agent should be highly soluble in cold water, to facilitate application thereof in the paper mill. Another practical requirement is that the agent shall not develop an objectionable coloration of its own when the treated paper is exposed to the atmosphere or to the action of oxidizing agents.

Now I have found that 2-(4'-dialkylamino-phenyl)-benzothiazole whose alkyl groups possess not more than 4 C-atoms each may be sulfonated to produce a monosulfonic acid which possesses excellent fluorescence powers of the proper bluish hue desirable for whitening paper. Furthermore, the alkali-metal and ammonium salts of these sulfonic acids possess relatively high water-solubility at room temperature and are thus very suitable for paper mill practice.

Accordingly, the novel compounds of this invention may be defined by the general formula

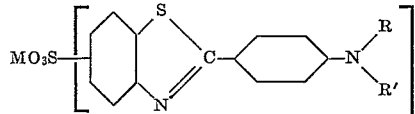

wherein R and R' represent alkyl groups of not over 4 C-atoms each, while M represents a cation of the group consisting of hydrogen, the alkali metals, and ammonium.

I prepare my novel compounds by subjecting the corresponding 2-(4'-dialkylamino-phenyl)-benzothiazole to sulfonation by the aid of oleum at moderate temperatures (for instance, 40° to 60° C.), then neutralizing the monosulfonic acid thus obtained with the desired base, for instance sodium-, potassium- or ammonium hydroxide, and recovering the corresponding sulfonate.

The initial materials are mostly known compounds. They may be prepared by reacting the corresponding p-dialkylamino-benzaldehyde with o,o'-diamino-diphenyl disulfide or with ortho-amino-thiophenol and sulfur, in the optional presence of an organic solvent such as trichlorobenzene or the monoethyl ether of ethylene glycol.

It is remarkable that when water-soluble monosulfonates according to this invention were prepared from 6-methyl-2-(4'-dimethylamino-phenyl)-benzothiazole which had been prepared by methylation of dehydrothioparatoluidine, the product was impure and gave on paper a fluorescence of an undesirable greenish hue, not well suited to achieve whitening effects.

Without limiting this invention, the following examples are given to illustrate my preferred mode of operation. Parts mentioned are by weight.

Part I.—Synthesis

Example 1.—Thirty parts of 2-(4'-dimethylamino-phenyl)-benzothiazole were added to 1000 parts of 25% oleum under agitation at room temperature. When the compound dissolved, the solution was heated to 50° C. and kept at this temperature until a sample dissolved to a clear solution in dilute aqueous caustic soda or sodium carbonate. This required about 1 hour. The reaction mass was then drowned in ice water, filtered and washed nearly acid free with ice water. The wet filter cake, which was the free monosulfonic acid derivative of the above base, was added to 100 parts of water and neutralized with sodium hydroxide at 85°–90° C., after which 15 parts of NaCl were added. The reaction mixture was cooled to 20° C. and agitated at this temperature until the mono(sodium-sulfonate) crystallized out. The final product was then filtered and washed with a 15% sodium chloride solution and dried. The mono(sodium-sulfonate) of 2-(4'-dimethylaminophenyl)-benzothiazole was obtained in good yield.

Example 2.—The free sulfonic acid filter cake made as described in Example 1 was neutralized with potassium carbonate and salted out in the same manner as above, except that KCl was used instead of NaCl. The mono-(potassium-sulfonate) was obtained in good yield.

Example 3.—The sulfonic acid filter cake made as described in Example 1 was neutralized with ammonium hydroxide and the resulting solution was evaporated to dryness. The end product was the mono(ammonium-sulfonate) derivative.

Example 4.—2-(4'-N-ethyl-methylamino-phenyl)-benzothiazole was sulfonated in the same manner as described in Example 1. The monosulfonic acid filter cake was neutralized with sodium carbonate and the solution was evaporated to dryness. The mono(sodium-sulfonate) of the base was obtained in good yield.

In a similar manner the following bases were monosulfonated and converted into their sodium salts.

Example 5.—2-(4' - diethylamino - phenyl)-benzothiazole.

Example 6.—2-(4' - dipropylamino-phenyl)-benzothiazole.

Example 7.—2-(4' - di-n-butylamino-phenyl)-benzothiazole.

Example 8.—2-(4'-N-butyl-methylamino-phenyl)-benzothiazole.

It will be understood that sulfonation can be achieved also by other methods, for instance by treatment with chloro-sulfonic acid followed by hydrolysis; but such methods are more expensive and are therefore less desirable. Various other equivalent modifications in the details of procedure will be readily apparent to those skilled in the art.

Part II.—Application to paper

Example 9.—Beater application.—To 1000 parts of bleached sulfite wood pulp (air dry basis) suspended in 20,000 parts of water in a paper beater machine at 20°–30° C. is added a solution of 1 part of 2-(4'-dimethylaminophenyl)-benzothiazole monosodium sulfonate dissolved in 100 parts of water. The mixture is circulated for 15 minutes after which are added 20 parts of standard saponified rosin size and 25 parts of alum $(Al_2(SO_4)_3 \cdot 18H_2O)$ The beating is continued for about 30 minutes after which the treated pulp is further diluted with about 180,000 parts of water, formed into a sheet in the usual manner and dried.

The paper thus obtained possesses a brilliant blue fluorescence when viewed in ultra-violet light. Viewed in ordinary daylight it appears much whiter and brighter compared to the dull appearance and yellowish hue of paper which has not been treated with the fluorescent agent.

In this example, the amount of fluorescent agent may be varied between 0.1 and 2.0 parts, producing varying degrees of brightness and whiteness. Instead of adding the fluorescent as a 1% solution it may be added in dry form. Likewise, the size or both the size and the alum may be omitted in this example thus producing an unsized white and bright paper. The fluorescent has good affinity for the cellulosic fibers even in the absence of additives.

*Example 10.—Surface application.*—One-half (0.5) part of 2-(4'-dimethylaminophenyl)-benzothiazole monosodium sulfonate is dissolved in 100 parts of 5% starch solution and used to treat 1000 parts (dry basis) of paper in sheet form (of average thickness; see below), at room temperature (20°–30° C.).

In general, paper in sheet form may be treated with aqueous solutions of the fluorescent agents of this invention either by transfer from a roll, or by dipping the paper into the solution followed by pressing between rollers, or by any other known method of surface application. The fluorescent may be dissolved in water and mixed with surface sizing solutions that are usually made with starch or glue. Although commercial applications require about 0.5% solutions, the fluorescent is soluble to the extent of 1.0%. Excellent brightening and whitening results are obtained with the concentrations specified. Ordinary writing paper is considered to be paper of average thickness. When paper of half this thickness is used, thus presenting twice the surface area per pound, the amount of fluorescent is increased proportionately. Likewise, for heavier papers the amount of fluorescent used per pound of paper is reduced.

I claim as my invention:

1. As new fluorescence agents, the monosulfonic acids and water-soluble monosulfonates of 2-(4'-dialkylaminophenyl)-benzothiazole, wherein the alkyl groups have no more than 4 C-atoms each.

2. A compound of the formula

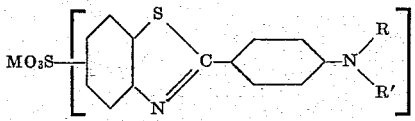

wherein R and R' represent alkyl groups of not over 4 C-atoms each, while M represents a cation of the group consisting of hydrogen, the alkali metals and ammonium.

3. An alkali-metal sulfonate of 2-(4'-dimethylaminophenyl)-benzothiazole.

4. An alkali-metal sulfonate of 2-(4'-N-ethyl-methylaminophenyl)-benzothiazole.

References Cited in the file of this patent

UNITED STATES PATENTS 2,550,321   Ackermann _____ Apr. 24, 1951

FOREIGN PATENTS 999,047   France _____ Sept. 26, 1951

OTHER REFERENCES

Chem. Abst., vol. 19, pp. 284–85, citing Borgert, Color Trade Jr. 15, 63–8.

Chem. Abst., vol. 26, pp. 1281–2, citing Borgert Collution Czechoslav Chem. Comm. 3 pp. 480–98 (1931).

Chem. Abst., vol. 42, pp. 5907–8, citing Schubert Ann. 558, 1410 34.